United States Patent [19]
Argentieri et al.

[11] 3,890,614
[45] June 17, 1975

[54] INTEGRATED RADAR-PNEUMATIC ALTIMETER DISPLAY DEVICE

[75] Inventors: Michael Argentieri, West Orange; Robert Kelso, Bloomfield, both of N.J.

[73] Assignee: Intercontinental Dynamics Corporation, Englewood, N.J.

[22] Filed: Feb. 20, 1973

[21] Appl. No.: 333,807

[52] U.S. Cl............ 343/5 DP; 73/384; 340/27 NA; 343/12 A
[51] Int. Cl......... G01l 7/00; G01s 9/04; G08g 5/00
[58] Field of Search..... 73/384; 340/27 AT, 27 NA; 343/5 R, 5 DP, 12 A

[56] References Cited
UNITED STATES PATENTS

| | | | |
|---|---|---|---|
| 2,351,563 | 6/1944 | Walker et al. | 340/27 NA |
| 2,538,843 | 1/1951 | McGuire | 340/27 AT |
| 3,165,745 | 1/1965 | Pike et al. | 343/5 R |
| 3,220,260 | 11/1965 | Mergler et al. | 73/384 |
| 3,595,077 | 7/1971 | Perkins | 73/384 X |
| 3,618,089 | 11/1971 | Moran, Jr. | 343/5 D P X |
| 3,625,060 | 12/1971 | McCallion et al. | 73/384 |
| 3,735,341 | 5/1973 | Hedrick | 340/27 R |

*Primary Examiner*—Malcolm F. Hubler
*Attorney, Agent, or Firm*—Ostrolenk, Faber, Gerb & Soffen

[57] ABSTRACT

An integrated display for either alternately or simultaneously displaying pressure derived barometric altitude and radar altimeter readings within a single display structure. Barometric altitude is displayed on a dual-counter and drum and a dial face and pointer to provide a barometric altitude reading and to further provide analog trending information. Radar altitude is displayed in a multi-segment filament or light emitting diode device. Means are provided for automatically energizing the radar altitude display at and below a predetermined altitude. Integration of the displays into a single indicator structure saves valuable panel space within a most critical area of the aircraft instrument panel. Circuitry is provided to generate a visual and/or audible alarm when the radar altitude is equal to or below the minimum decision height (MDH). The two altitude readings, i.e., pressure and radar derived, serve as accuracy checks on one another.

3 Claims, 3 Drawing Figures

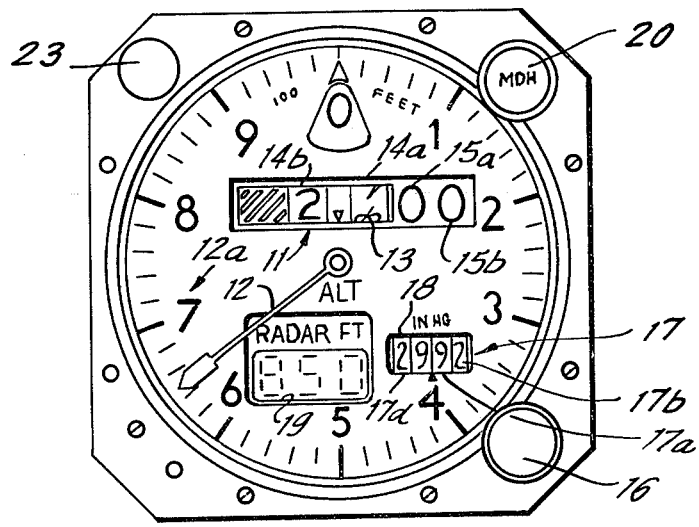

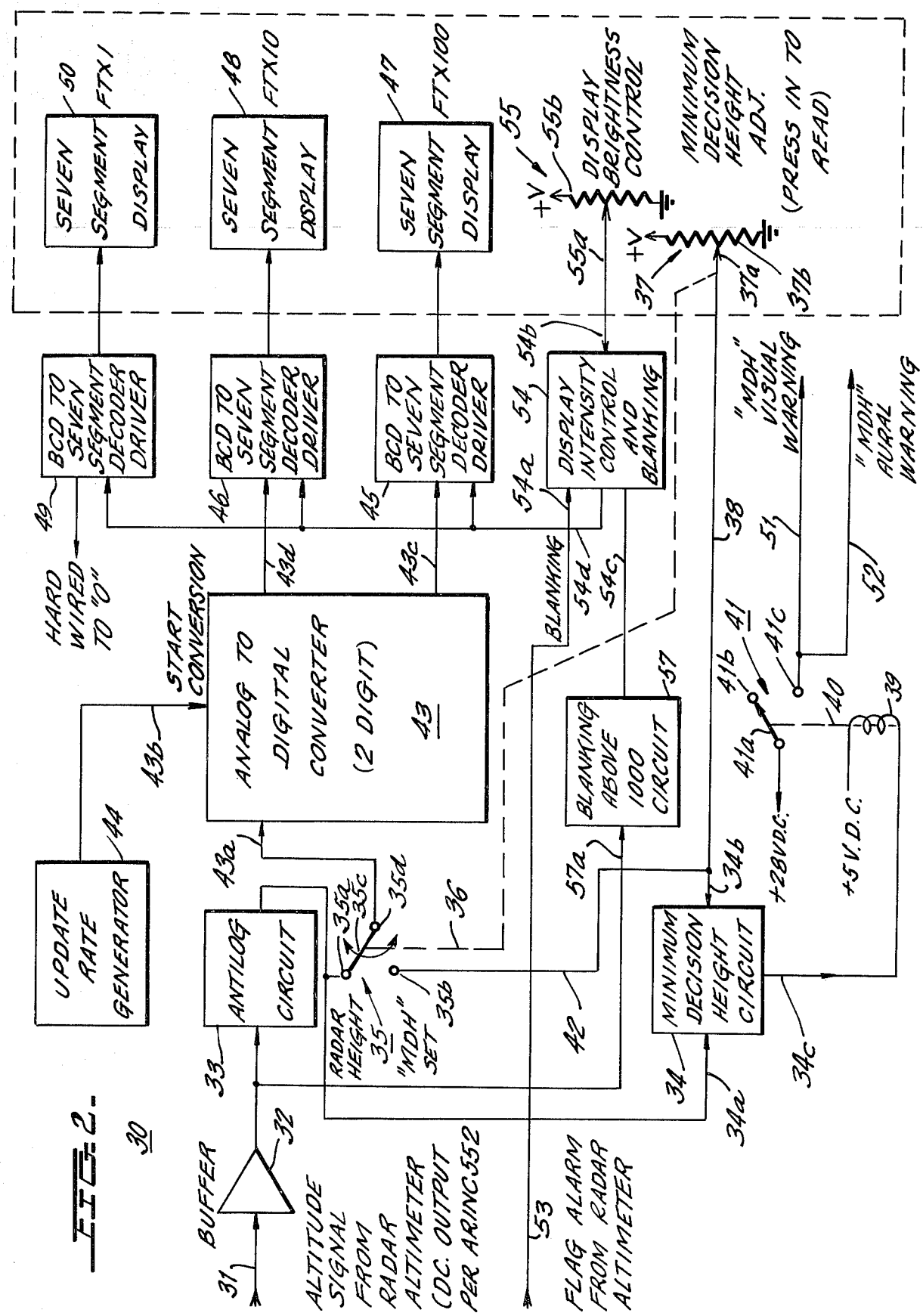

INTEGRATED RADAR-PNEUMATIC ALTIMETER DISPLAY DEVICE

The present invention relates to aircraft instrument panels and more particularly to a novel integrated pressure derived altitude and radar altitude device in which the readout displays are integrated into a single indicator dial.

BACKGROUND OF THE INVENTION

Present-day aircraft of both the military and commercial types typically employ both barometric altimeters and radar altimeters. Barometric altimeters are usually employed to define aircraft flight levels and to insure separation in flight. They are also employed as a reference for level flying (a ground clearance reference would result in a nonlevel flight) and, when properly adjusted with respect to the ground barometric pressure at the intended landing site, for landing.

Radar altimeters are employed to directly measure the height of the aircraft above the terrain or body of water. When used over water or flat terrain of known elevation, the difference between barometric and radar altitudes can be employed to measure ground barometric pressure from an aircraft. More important to the instant invention, the radar altimeter at altitudes of 2,000 feet or less above the terrain or water tends to be more accurate than pressure-derived barometric altitudes.

For the above reasons, it is deemed desirable to have barometric and radar altitudes displayed to the flight crew of an aircraft. Currently, separate indicators are employed to display the two types of altitude information, thus occupying a greater than necessary amount of the critical space within an aircraft instrument panel.

A BRIEF DESCRIPTION OF THE INVENTION AND OBJECTS

It is the essence of the present invention that the two types of altitude be displayed simultaneously and upon a single indicator. The present invention is comprised of a single display face on which barometric altitude is displayed upon a dual counter and drum and on a dial and pointer to provide a reading of the barometrically derived altitude, as well as providing analog trending information. Barometric settings, i.e., adjustments) are accomplished by a manual knob coupled to a display counter to effect barometric pressure correction, and also coupled to adjust the pressure sensing device. In one portion of the single display face, radar altitude is displayed on a 7 segment filament or light emitting diode digits. This provides the pilot with closely spaced readings of two independent sources of altitude on the same dial face, which saves time and makes for easier comparison. The two displays are sufficiently different from one another so as not to be confused, and trending information of the dial and pointer portion of the barometrically derived altitude reading is valid even when referring to the radar display.

Radar altitude warnings at a settable distance above ground are manually settable by depressing a knob forming part of the display structure. Circuitry is provided for generating a visual and/or audible alarm which is sounded when the radar altitude is equal to or below the MDH value. At any desired time the set MDH value can be read out on the display by depressing the MDH knob.

It is therefore one primary object of the present invention to provide a novel instrument for aircraft and the like in which barometric pressure derived and radar derived altitude readings may be simultaneously and/or selectively displayed upon a single display face structure with the capability of providing a visual and/or audible alarm for indicating to the pilot that the aircraft is at or below the minimum decision height.

BRIEF DESCRIPTION OF THE FIGURES

The above, as well as other objects of the present invention will become apparent when reading the accompanying descriptions and drawings in which:

FIG. 1 shows the dial face of an instrument embodying the principles of the present invention.

FIG. 2 shows a block diagram of the radar altimeter digital display circuit for use in generating the radar derived altitude display in the dial face arrangement of FIG. 1.

FIG. 3 is a perspective view of a barometric pressure device usable with the instrument of the present invention.

DETAILED DESCRIPTION OF THE FIGURES

Considering initially FIG. 1, there is shown therein an altimeter dial face structure 10 in which barometric altitude is collectively displayed on a dual counter and drum structure 11 and on a dial 12a and pointer 12. The dial face of the instrument 10 is provided with a rectangular shaped opening 13 behind which is positioned the dual counter and drum structure which, in the preferred embodiment of the present invention, comprises two number wheels 14a and 14b (see also FIG. 3) for respectively displaying the barometric pressure derived altitude reading in hundreds and thousands of feet. The two zero digits 15a and 15b, which represent the tens and units of feet are printed or otherwise formed on the surface of the dial face to simplify the reading of the counter number wheels. The outer periphery of the dial face is marked with the decimal for numbers 0 through 9 for indicating hundreds of feet, with the graduations between any two decimal numbers providing for readings down to 20 foot intervals. The markings around the periphery dial face cooperate with dial pointer 12 to provide a reading in hundreds of feet and cooperate with the dual counter and drum 11 to form a composite reading. For example, as shown, dual counter and drum indicates that the reading is between 2,600 and 2,700 feet. By referring to dial pointer 12, it can be seen that the reading in hundreds of feet is 650 feet. Pointer 12 cooperates with the markings around the dial face to provide analog trending information, as well as permitting accurate readings of 20 foot intervals. The barometric setting is accomplished by a manually adjustable knob 16 and a counter and drum structure 17 to effect barometric pressure correction. In one embodiment, the counter and drum structure 17 is comprised of a counter (not shown) having four number wheels 17a–17d positioned immediately behind a window 18 provided in the front dial face to display a barometric pressure reading in inches of mercury. Presently, the display is set to indicate a reading of 29.92 inches of mercury. It should be understood that manually settable knob 16 is mechanically coupled to the counter which operates number wheels 17a–17d to adjust and thereby correct the barometric pressure reading. Other barometric altimeter designs, such as the three-pointer or drum pointer, can be used. The altimeter can be a diaphragm actuated type, with or without a servo, or can be a servo indicator coupled to an air data computer.

Radar altitude is displayed in a window 19 with the radar altitude display as shown in FIG. 1 being comprised of a three-digit display capable of displaying altitude readings from 000 to 990 feet. However, it should be understood that additional digit positions can be employed where high altitude radar readings are desired. Each digit position of the radar display may be comprised of 7 segment filament of the solid state type. The decimal digits being displayed behind window 19, shown in FIG. 1, show a reading of 850 feet. It should be noted that the solid state display of FIG. 1 is of the 7 segment type. For example, it should be noted that the hundreds of feet digit (i.e. digit 8) is generated by lighting 7 separate segments (3 horizontally aligned and 4 vertically aligned) which cooperate, when all are illuminated, to collectively form the decimal digit 8. By selectively illuminating certain of these segments, any other decimal digits may be formed. For example, the tens of feet decimal digit 5 is formed by extinguishing or failing to light the two diagonally opposite vertically aligned at the lower left and upper right segments of the 7 segment digit display. The units display digit, in the present preferred embodiment, is shown as being "hard wired" so as to constantly generate the decimal digit 0 since the radar altitude reading in tens of feet provides sufficient accuracy. However, if desired, this digit position may be operated to display any decimal digit from 0 to 9.

A radar altitude warning at a settable distance above the ground is manually settable by pressing in rotatable knob 20, provided in the upper right-hand corner of the instrument. The knob may be depressed to one of two levels A and B. At the first level A the MDH is indicated in place of the radar altitude. Turning of the knob will have no effect on the MDH displayed. Pressing further to level B will engage a potentiometer. Turning the knob at this level will change the setting of the MDH.

FIG. 2 is a block diagram of the radar altimeter digital display circuit 30 and is comprised of an input line 31 to which is fed the altitude signal from the radar altimeter device (not shown for purposes of simplicity). This is a non-linear d.c. level, representing the radar altitude, which signal is applied to buffer 32. The buffer has three functions, (1) it presents a high impedance to the output of the radar circuit to prevent loading effects; (2) it changes the signal to the desired level and (3) it presents this signal at a low impedance to the following circuitry. The buffer output is applied to an antilog circuit which converts the non-linear radar signal to a signal which is directly proportional to altitude. The output of antilog circuit 33 is simultaneously coupled to one input 34a of a minimum decision height circuit 34 and to the terminal 35a of a switch means 35, which further comprises a first stationary contact 35b and a movable switch arm 35c pivotally coupled to terminal 35d and selectively engageable with the stationary contacts 35 a and 35b. Although not shown for purposes of simplicity, switch arm 35c is biased, for example, by spring means, to normally engage stationary contact 35a. By depressing the control knob 20 shown in FIG. 1, the movable arm 35c may be moved to engage stationary contact 35b for a purpose to be more fully described. Movable switch arm 35c is further mechanically linked (as shown by dotted line 36) to the slide arm 37a of a potentiometer 37, which is further comprised of a resistance element 37b coupled between a d.c. supply source +V and ground reference potential. Slide arm 37a may be adjusted to any position along the resistance element 37b by rotation of knob 20 shown in FIG. 1 to adjust the voltage level at the point of contact of slide arm 37a. Slide arm 37a is electrically coupled through lead 38 to a second input 34b of minimum decision height circuit 34, having an output 34c electrically coupled to one terminal of solenoid 39, whose opposite terminal is coupled to +5 VDC. Solenoid 39 is provided with an armature (not shown for purposes of simplicity) which is mechanically coupled, as shown by dotted line 40, to a switch arm 41a of a switch having stationary contacts 41b and 41c. Switch arm 41a is coupled to a voltage source +28 VDC.

Slide arm 37a is further coupled through lead 38 and lead 42 to stationary contact 35b of switch means 35. Terminal 35d of switch arm 35c is electrically coupled to the input 43a of an analog-to-digital converter 43. A second input 43b is electrically coupled to the output of an update generator 44 which triggers the A/D converter 43 at a predetermined rate to start the conversion process.

The analog-to-digital converter 43 is a two-digit binary coded decimal converter capable of converting the analog voltage level applied to its input into two separate binary coded decimal output signal groups, appearing at outputs 43c and 43d, respectively. Although only a single output line is shown for each of these outputs 43c and 43d, it should be understood that four such lines are provided for each digit position, with the binary combination appearing at these lines being capable of representing any decimal digit from 0 to 9. Outputs 43c and 43d are respectively coupled to binary coded decimal to 7 segment decoder drivers 45 and 46 respectively, which constitute driver circuits for providing voltage signals of suitable amplitude to the 7 segment solid state displays 47 and 48 respectively. Seven segment display 50 is coupled to its binary coded decimal to 7 segment decoder driver 49, which in turn has its input "hard wired" to constantly display the decimal digit 0 for the units in position of the radar display.

Switch means 41 has its stationary contact 41c simultaneously coupled to output lines 51 and 52 which may, in turn, be coupled respectively to lamp and audible alarm devices (not shown for purposes of simplicity) for providing both visual and audible alarms to indicate the fact that the aircraft is at or below the "minimum decision height."

A flag alarm signal derived from the radar altimeter is applied to input line 53. The flag alarm signal is a positive voltage level when the radar altimeter is functioning properly. If a malfunction occurs in the radar altimeter the flag alarm voltage will disappear. The signal is applied as a blanking signal to the display intensity control and blanking circuit 54 whose output 54d is simultaneously coupled to each of the driver circuits 45, 46 and 49. If the flag alarm voltage disappears the Display Intensity Control and Blanking circuit will automatically turn off the seven segment displays. A second input 54b is coupled to the slide arm 55a of a potentiometer 55, which is further comprised of a resistance element 55b, coupled between voltage source +V and ground or reference potential. Slide arm 55a is mechanically coupled to manually rotatable brightness control knob 23 (this coupling being omitted for purposes of simplicity) provided along the front face of the instrument, as shown in FIG. 1. Adjustment of slide arm 55a along its associated resistance element 55b controls the brightness of the three-element display forming the radar altitude reading. Input 54c is coupled to blanking circuit 57 which is controlled by the altitude signal from buffer 31 to selectively permit illumination of the radar display only when the aircraft is flying below 1,000 feet.

The control operation of the minimum decision height circuit 34 is as follows:

Minimum decision height circuit 34 is a comparison circuit which compares the analog signal level at its input 34a against the analog signal level at its input 34b (derived from potentiometer 37). When the signal level at input 34a is equal to or less than the signal level at 34b, output line 34c is energized which, in turn, energizes solenoid 39 causing its armature to move switch arm 41a into engagement with stationary contact 41c which energizes visual 51 and audible 52 alarm lines referred to hereinabove, with +28 VDC. The alarms will continue to be operated until a signal level at input 34a rises above the signal level applied at input 34b. The analog signal level at input 34b is adjusted by rotating knob 20, shown in FIG. 1. In order to determine the exact setting of the signal level at input 34b, knob 20 is depressed, causing switch arm 35c to engage stationary contact 35b, applying the d.c. level at slider arm 37a to the input 43a of analog-to-digital converter 43, which converts the analog level signal into two binary coded decimal outputs appearing at 43c and 43d respectively. These outputs are sufficiently amplified by driver circuits 45 and 46 to selectively illuminate those segments of the 7 segment displays 47, 48 to form decimal digits representative of the minimum decision height. When the display is adjusted to the desired setting, knob 20 is released, returning switch arm 35c to engagement with stationary contact 35a and turning off displays 47 and 48.

Thus, the altitude signal from the radar altimeter, which is a d.c. level signal, is applied to buffer 32 and antilog circuit 33, switch 35, and input 43a to the analog digital converter 43 for displaying the tens and hundreds decimal digits representing the radar altimeter reading. The flag alarm signal from the radar altimeter is developed as soon as the terrain clearance is below some preset value, causing the display intensity control and blanking circuit 54 to provide an output signal at 54c, which simultaneously enables each of the driver circuits 45, 46 and 49 to cause the display 47, 48 and 50 to be operated. The intensity of the display is controlled by the display brightness control potentiometer 55, which is adjustable through the manual resettable knob 23, shown in FIG. 1. In instances where it is desired, it is possible to have the radar altitude measuring system operating at all times, which may be done simply by "hard wiring" input 54a to a suitable signal level to provide enablement of the radar altitude readings at all times.

FIG. 3 shows one arrangement of an altimeter structure in which like elements as between FIGS. 1 and 3 have been designated by like numerals. Manually operable control knob 16 in the embodiment of FIG. 3 is provided with an edge gear 70 which simultaneously meshes with gears 71 and 72. Gear 72 is secured to shaft 73 which also has gear 74 provided at its rearward end. Gear 74 meshes with gear 75a provided on diaphragm powered pressure altitude mechanism 75, which is mounted for rotation by any suitable means (not shown) to receive a mechanical differential thereby. The output shaft 76 of device 75 controls pointer 12 and altitude display counter 14 (note also FIG. 1) through meshing beveled gears 79 and 80.

Gear 70 provided on shaft 81 meshes with intermediate gears 71, 77 and 78. Gear 78 is secured to a shaft upon which bevel gear 58 is mounted. Gear 58 meshes with bevel gear 59, which gear is coupled to the shaft of altitude barometric setting tape counter 17. Tape counter control knob 16 sets a particular barometric setting which is viewable through the dial face window 18. This setting is automatically coupled into the altitude setting by rotating the input gear 75a of pressure altitude mechanism 75, so as to obtain a pressure corrected altimeter reading.

A setting of the barometric pressure reading may be adjusted at any time simply by rotation of knob 16.

The non-linearity of the barometric setting provided on the tape mechanism 17 (which is set forth in detail in corresponding application Ser. No. 205,577, filed Dec. 7, 1971, and assigned to the assignee of the present invention) is controlled simply by printing the settings of the non-linear spacing arrangement so as to maintain a functional relationship between the altitude and a barometric setting number.

The combination of the radar barometric altitude displays in a single valve face arrangement has the following advantages:

1. The pilot can refer to two independent sources of altitude on the same dial face, while making his landing approach. This saves time and makes for easier comparisons.

2. The two displays are sufficiently different from one another so as not to be confused. Trend information provided by pointer 12 is valid even when referring to the radar display.

3. In what is referred to as a QNH baro setting, the barometric altitude reads the airfield surveyed altitude upon landing of the aircraft (i.e., "feet above sea level"), while the radar altitude reads 0. In the instant system, the radar display is a big help in providing the actual ground clearance.

4. In what is referred to as a QFE baro setting the barometric and radar altitude will both read zero on the ground (i.e., QFE setting is zero regardless of the surveyed altitude of the airfield). Altitudes above the airport should be substantially the same in level terrain. The instrument of the present invention provides for both direct and rapid comparison of the two altitude measurements.

5. Assuming the radar altimeter which feeds the radar altitude display is always turned on in flight, the detector which turns it off above 1,000 feet from the ground, which is shown as detector circuit 58, eliminates the unused information from the dial. However, as the aircraft nears the intended landing field, or a mountain peak, the useful radar display will be energized and the pilot appropriately warned. Circuit 57, which has its input 57a coupled to the output of buffer 32, serves to provide a second blanking control to display intensity control and blanking circuit 54, by blanking out the radar display reading for altitudes above 1,000 feet. The blanking circuit may either be "hard wired" or may be made adjustable if desired, in cases where the 1,000 foot altitude is an insufficient level for certain flight situations.

6. During takeoff, the barometric altitude is sometimes subject to serious errors, due to static pressure setting errors near the ground and as a result of rotation of the aircraft. In this case, the radar information is at its best and can be referred to in the same location on the instrument panel as the barometric altitude.

7. Extremely valuable instrument panel space in a most critical area is saved by having both indicators integrated into a single dial face configuration.

Although there have been described preferred embodiments of this novel invention, many variations and modifications will now be apparent to those skilled in the art. Therefore, this invention is to be limited not by the specific disclosure herein, but only by the appending claims.

The embodiment of the invention in which an exclusive property or priviledge is claimed are defined as follows:

1. A compact instrument for displaying an altitude reading comprising:
   a housing having a front face;
   said front face having a window;
   electronic decimal multi-digit illuminated display means positioned behind said dial face for displaying an illuminated multi-digit altitude reading;
   first means for receiving an analog signal representative of an altitude signal;
   second means for converting an analog signal into a plurality of binary coded decimal digit signal groups representative of the analog signal applied to said second means;
   third means coupled to said second means for coupling said signal groups to associated digit positions of said decimal multi-digit display means to provide an illuminated display of an altitude reading;
   an adjustable knob positioned to be accessible at said front face, said knob being linearly movable between first and second positions and being rotatable about a central axis;
   fourth means for generating an analog voltage whose magnitude represents the amount of rotation of said knob;
   switch means operative under control of said knob for selectively coupling only the output of said first means to said second means when said knob is in said first position and for coupling only the output of said fourth means to said second means when said knob is in said second position;
   comparison means coupled to said first means and said fourth means for generating an alarm signal whenever said knob is in said first position and the signal level derived from said first means is equal to or less than the signal level derived from said fourth means.

2. A compact instrument employed in an aircraft for displaying composite altitude readings in closely spaced manner comprising:
   a single dial face;
   said dial face having indicia around its periphery for representing altitude readings;
   a rotatably mounted pointer having its free end adjacent the periphery of said dial face and cooperating with said indicia for providing an altitude reading;
   barometric means coupled to said pointer for providing a barometric-pressure-derived altitude reading;
   a first window in said dial face and being located within the periphery of said dial face;
   electronic decimal multi-digit illuminated display means positioned behind said dial face first window for displaying a second multi-digit altitude reading;
   first means for receiving an analog signal representative of a radar derived altitude signal;
   second means coupled to said first means for converting said analog signal into a plurality of binary coded decimal digit signal groups representative of the analog signal;
   third means coupled to said second means for coupling said signal groups to associated digit positions of said decimal multi-digit display means;
   adjustable means for generating an analog voltage level under control of a rotatably adjustable knob positioned adjacent said dial face;
   comparison means coupled between said first means and said adjustable means for generating an alarm signal whenever the signal level derived from said first means is equal to or less than the signal level derived from said adjustable means;
   first alarm means coupled to said comparison means for generating a visible alarm when said alarm signal is present;
   switch means comprising a switch arm having a first end selectively coupled to either the output of said first means or said adjustable means;
   said knob further being movable to a depressed position;
   linkage means coupling said knob to said switch arm for coupling said switch arm to said first means when said knob is not depressed and for coupling said switch arm to said adjustable means when said knob is depressed;
   the opposite end of said switch arm being coupled to said second means whereby the analog signal generated by said adjustable is displayed by said second display means only when said knob is depressed, to facilitate adjustment of said adjustable means.

3. The device of claim 2 further comprising second alarm means coupled to said comparison means for generating an audible alarm whenever said alarm signal is present.

* * * * *